Figure 1:
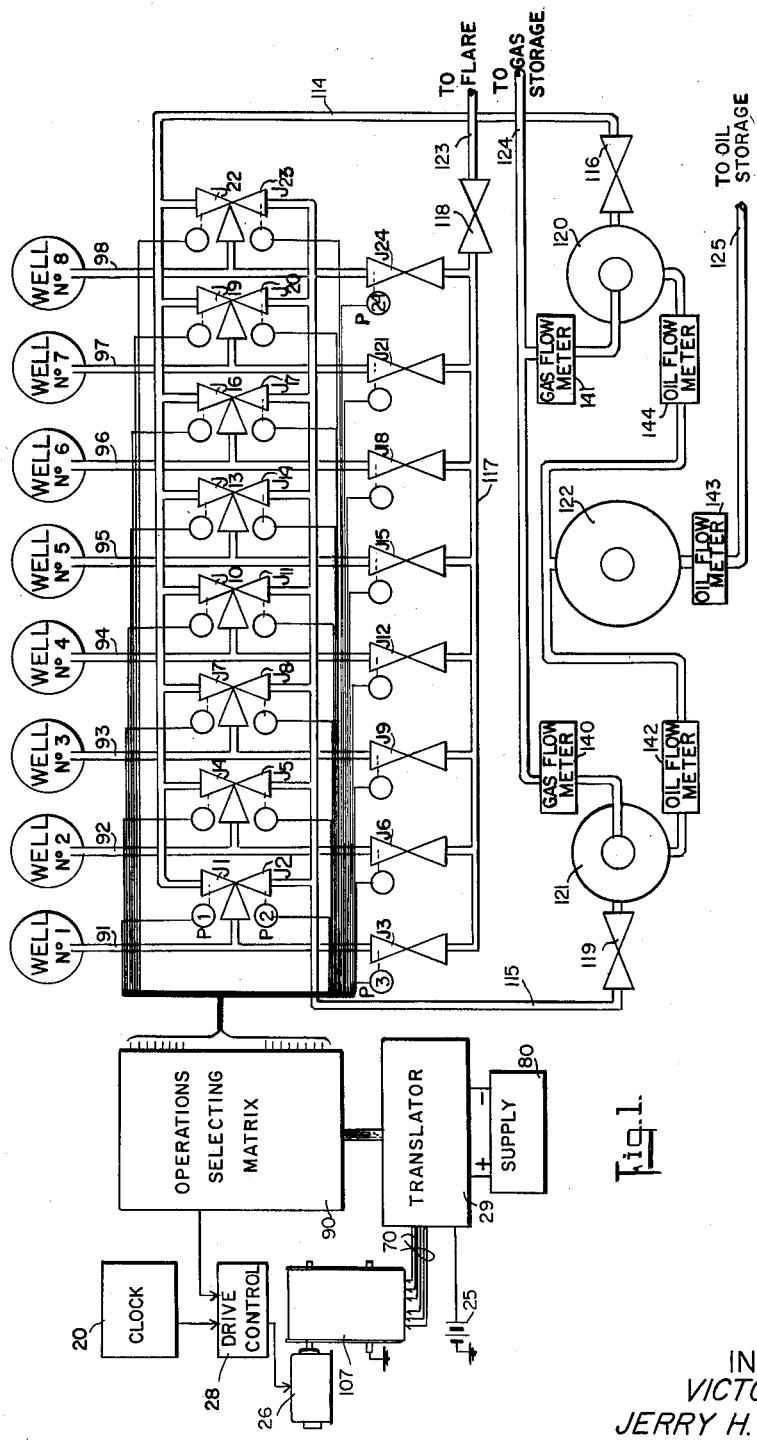

July 2, 1963

V. HARMS ETAL 3,096,507

SYSTEM AND APPARATUS FOR PROGRAMMED CONTROL
OF OIL WELLS AND THE LIKE

Filed Feb. 20, 1959

3 Sheets-Sheet 1

INVENTORS
*VICTOR HARMS*
*JERRY H. SCHWARTZ*
by *R.J. Filipkowski*
AGENT

INVENTORS
VICTOR HARMS
JERRY H. SCHWARTZ
by R. J. Filipkowski
AGENT

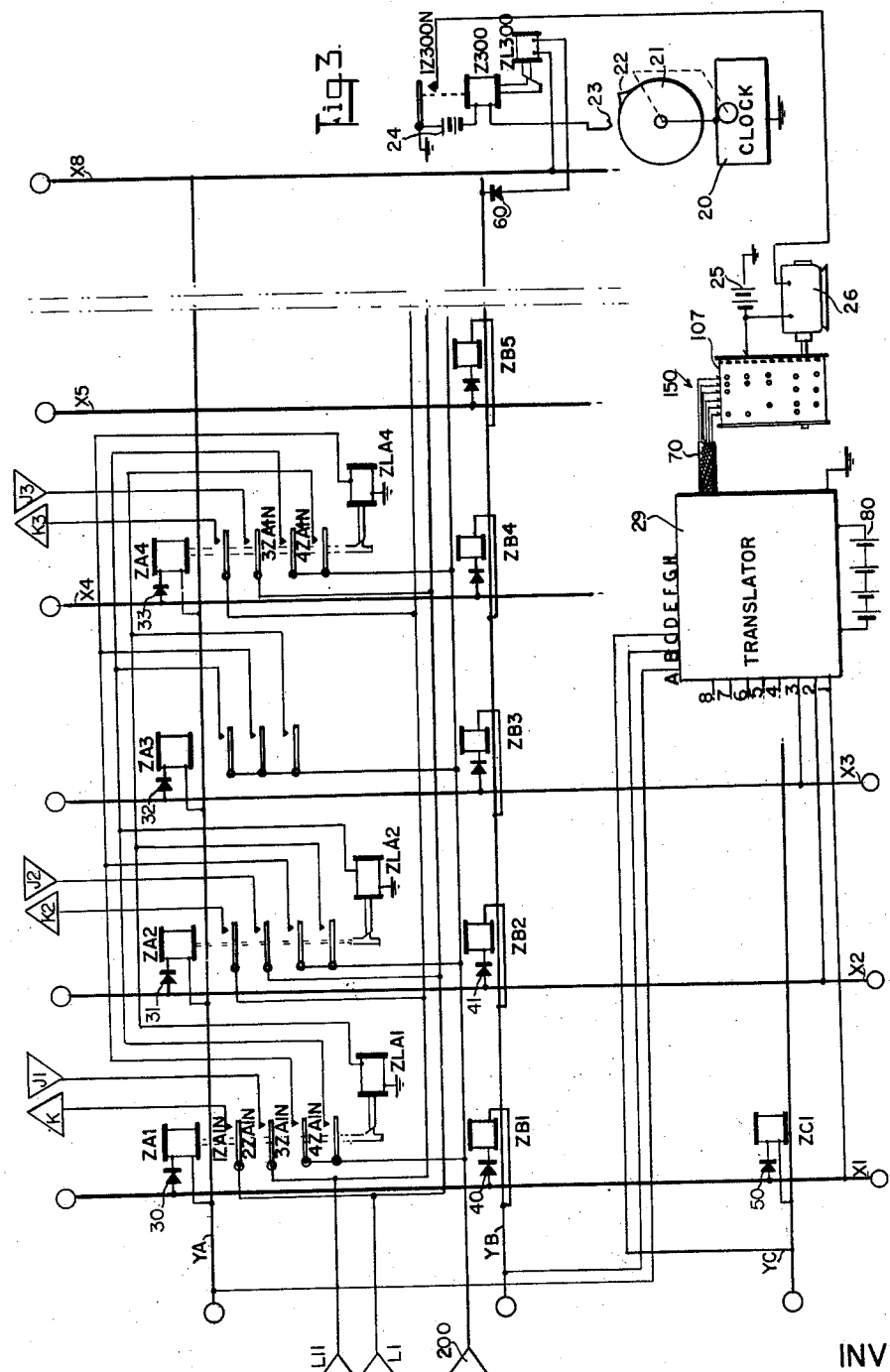

United States Patent Office 3,096,507
Patented July 2, 1963

3,096,507
SYSTEM AND APPARATUS FOR PROGRAMMED CONTROL OF OIL WELLS AND THE LIKE
Victor Harms, 4224 16th St. SW., and Jerry H. Schwartz, 3032 Hampton Crescent, both of Calgary, Alberta, Canada
Filed Feb. 20, 1959, Ser. No. 794,715
6 Claims. (Cl. 340—147)

This invention relates to automatic control equipment for the unattended direction of fluid flow from a group of wells over a period of time.

More specifically, the invention relates to a system and apparatus for carrying out a planned program of timed production from a group of petroleum wells according to predetermined allowable production rates.

At the present time the administrative authorities supervising the utilization of petroleum reserves, permit only a fraction of the maximum potential flow rate of an oil well to be utilized in producing oil. For example, the allowable production rate may be set at a number of barrels per day which is computed as an arbitrary fraction of a short time maximum flow rate potential of the well; or alternatively, the allowable production may be set as a fraction of the flow potential as determined by permitting free flow at intervals for short periods, modified by a factor determined from the gas-oil ratio of such flow.

In a producing field wherein a relatively large number of oil wells may be required to be tested periodically, a considerable maintenance expense is involved in manually directing and controlling flow of wells. It has been found that the peak flow rate of a well approaches its true potential when tests of its free-flow rate are taken at relatively short intervals, for example every six hours. Where a number of oil wells may be spaced at a considerable distance in a field, and the terrain and climate may be difficult, it has proved impossible to manually provide the required control of production. This represents a very considerable loss in that the allowed flow rate as computed falls according to demonstrated flow-rate tests.

This invention is accordingly concerned with the provision of automatic production control systems, whereby a production battery serving a number of wells may be entirely automatically operated. It will be appreciated that in the production of oil, it is necessary to provide a flow direction valve control in the line from the well, to divert the oil either to a test processor or to storage or other destination. The determination of maximum flow rate may require that flow from the well at its maximum flow rate be delivered to open storage, or a flare line, while for determining the gas-oil ratio, the flow will require to be directed through the gas separator. Accordingly a well on test requires the selection of one of several destinations by suitable valve means. Where a battery of for example twelve wells is to be operated in such manner, it will be appreciated that manual production control, with inherent possibility of human error, may be wasteful and cause possible damage or confusion of data in addition to being costly. The system according to the present invention therefore seeks to provide equipment for the complete control of all flow directing valves from a central monitor and control point, by devices co-ordinated by and responsive to a record on which a prepared program of events has been stored.

The control equipment according to the invention for automatic production from a battery of oil wells essentially consists of a master clock for determining a basic time interval within which each sequence of operations is initiated; a program designating events to occur in each interval in code record form, as for example strip, tape, punch card, magnetic tape, etc.; a translator, for producing a single pair of outputs according to the code on the program record; a selector matrix, in which one relay is energized and provides that one specified event only is caused to occur according to the output received from the translator; and pilot controls for initiating and effecting signalled changes in field equipment for routing oil well flow.

In the following description, a preferred embodiment is described employing a tape record on which a program for a certain long interval of time, for example one month's operation of a field, is stored, and wherein the data for each change of state is coded as transverse rows of perforations.

Figure 2:
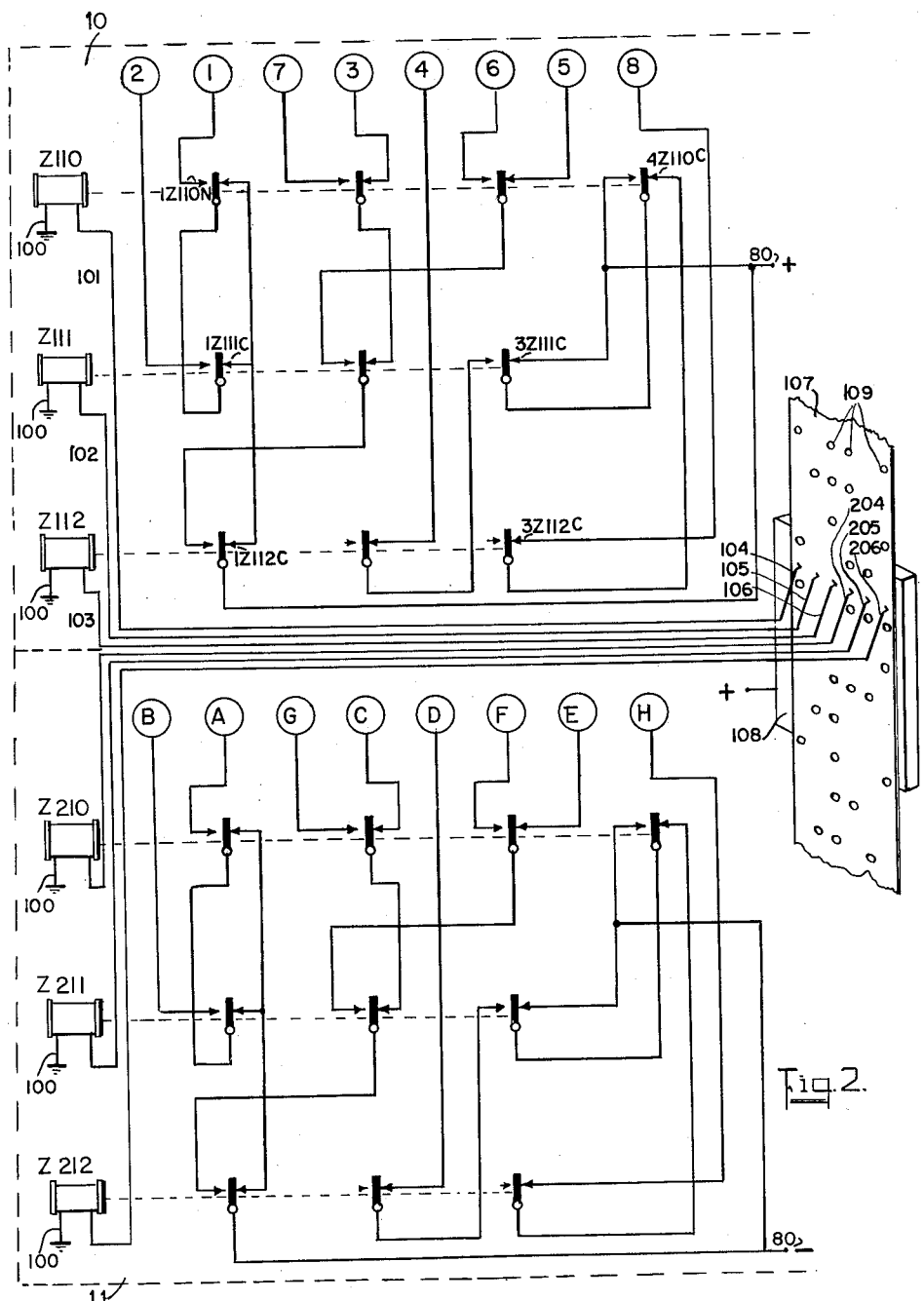

The invention may be the better understood in its purposes and practice by a careful reading of the following description and claims with reference to the accompanying figures of the drawing wherein, FIG. 1 is a schematic control and flow diagram of a stored program instructed control apparatus serving a producing group of petroleum wells;

FIG. 2 is a circuit diagram of a translator for energizing a relay matrix according to recorded instructions on a tape record; and FIG. 3 is a partial circuit diagram illustrating the manner of selectively energizing electromagnetic switching elements, including control of interval for which the elements are operative.

*Flow Directing System*

Referring to FIG. 1, there is shown in schematic form the control and flow diagrams for remote automatic control of timed production from a field comprising a group of oil wells numbered 1 to 8 inclusive. Each of lines 91, 92, . . . 98 from the wells is shown to be branched, the branches being respectively connected with a two-way valve, for instance, on well No. 1, J1 and J2, and with a one-way valve J3. With J3 and J2 closed, flow will be directed over J1 through trunk line 114 and valve 116, to a production separator unit 120. Such unit, as is well known in the art, is effective to separate the gas content of petroleum brought up by the well from its oil constituents. A gas trunk pipeline 124 conveys gas liberated, through gas flow meter 141, to gas storage or utilization means (not shown). Flow of oil is similarly directed through oil flow meter 144, to a storage unit 122, and thence conveyed as by trunk line 125 through oil flow meter 143 to remote storage or utilization systems.

With J1 closed, and J2 opened, the flow from the well is delivered by common line 115 and through vlave 119, to a test separator unit 121. Such unit is arranged to separate the gas portion of the flow from the petroleum crude, the total flow being the maximum rate that the well will produce without throttling or choking as in the case of production flow.

It will be understood that the purpose of such testing is to determine and measure the volume of flow, both gas and liquid, obtained from a well under free flow conditions. Accordingly, the output from unit 121 is carried through gas flow meter 140 and oil flow meter 142, to respective gas storage and oil storage equipment. Such free flow is usually limited to a short interval of time, and the amount of flow delivered is subtracted from the total allowable daily flow to determine what production flow will be permitted.

It will be understood that the operation of the control valves must be arranged to positively ensure that only one valve at a time is allowed to be open. For instance, if valve J3, which would permit the products of the well, usually gaseous, to be carried by line 117 and valve 118 to a flare or other disposal means 123, remained open while J2 is also open or partly open, erroneous gas/oil ratios would be determined during a test period. Similarly, while a number of wells may have their production flow valves J1, J4, J7, . . . J22 open at one time, only only one well at a time may be tested. The capacity of a flare or other disposal unit 123 may be inadequate if more than one of the test flow valves J3, J6, . . . J24 is open at one time.

In a preferred control scheme according to the invention, all of the operable elements such as J1, . . . J24, as well as ancillary devices, are arranged to be selectively energized from an operations selecting matrix 90. This matrix, to be described in greater particular hereinafter, performs switching operations whereby the potentials from a supply source 80 are applied to energize pilot valves such as P1, P2, . . . P24, for effecting the opening and closing thereof. For example, a pilot valve such as P1 may comprise a conventional solenoid actuated valve, which in its operated state admits a supply of fluid, for example compressed air, from a suitable source (not shown), to a pneumatic motor effective to turn the valve J1 fully open, which position is maintained as long as the solenoid remains energized. When the solenoid is de-energized, the reverse rotation of the motor may be produced, to fully close the valve J1. It will be apparent that many types of control valve and main valve may be selected from the prior art for the accomplishment of particular objectives, and it is entirely feasible to control the closing of valve J1 by a separate solenoid, e.g., P2, which opens J2 after a delay.

The control equipment, the several elements of which will be further elaborated below, is set into operation periodically at intervals determined by a clock 20. An impulse timed to occur, for example, every five minutes, initiates drive by motor 26 controlled through drive control 28, to advance a tape record 107. A set of sensing feelers designated 150 are suitably supported in transducing relation with code perforations of the tape, to deliver on/off signals by leads 70 to a translator 29.

It is to be understood that the time interval between successive actuations of drive 26 may be less than or greater than five minutes according to the required changes in the flow relations of valve groups for each period. As the record medium 107 is advanced, the patterns of perforation presented to the sensing feelers 150 will cause sets of signals to be applied to translator 29, each set signalling a change in a valve setting or other adjustment. In general, when the tape commences its movement, a number of instructions will be "read" in turn, corresponding to the items of a schedule of operations planned to be fulfilled within the time interval chosen. The several changes in state signalled to the pilot valves such as P1 will in general be rapidly carried out so that the tape 107 runs for only a fraction of the clock timing interval.

The motor 26 is stopped when a stop signal is fed from matrix 90, the latter responding to a particular coded pattern appearing at feelers 150 as the last instruction handled within the time interval. The motor does not start again until the next clock timing pulse is produced and fed to unit 28.

*Translator*

This apparatus comprises two units respectively designated 10 and 11 in FIG. 2, each providing a means for receiving, on three inputs, "Off-On" signals provided from corresponding control channels, here represented by rows of holes along the tape 107, and for delivering, from eight outputs, an appropriate single channel signal, which is complementarily related with a signal produced by a similar corresponding equipment, for joint actuation of relay windings in matrix 90 connected therebetween.

The translator obviates the need for having eight separate inputs which would be required if direct correspondence had to be provided between the input and output terminals of regenerating or conversion apparatus. Moreover, the translator also regenerates signals which may originate from a low power source, or which may be remotely transmitted in another code, to produce an output at appropriate power and/or voltage levels, as for example, the potentials of supply 80.

The translator decoding function is based on the fact that the number of permutations possible when a group of control elements may each have a number of states, is according to the relation:

$$Q = n^x$$

where Q is the number of separate combinations, $x$ is the number of elements, and $n$ is the number of states possible for each element. For a group of $x$ relays each having an energized and a de-energized state, $$Q = 2^x$$

In the drawing, the translator 10 is conveniently realized as a group of three relays interconnected as shown, having a common terminal 100 at ground reference potential, and having their individual winding leads 101, 102, and 103, connected to sensing fingers or wipers 104, 105, 106. The wipers are suitably supported to track along the rows of perforations in a record strip 107. A counter-electrode 108 which is held at a potential different from that of any terminal such as 101 is arranged to be contacted by the wipers whenever a hole such as 109 is presented therebetween by the perforations in the strip applied according to a particular program.

Translator relay winding Z110 is associated with a four-pole double-throw armature/contact assembly and associated relays Z111 and Z112 are each three-pole double-throw units, the armatures and contacts being interconnected as shown. For each combination of energized and deenergized relay states, there will be a single output terminal of the group of terminals 1 to 8 inclusive connected to positive potential, as may be seen by reference to the diagram of FIG. 2. In the absence of any input to the wipers, output terminal 8 from the translator is energized at positive potential, being connected over contacts 3Z112C, 4Z110C, and 3Z111C. When only Z110 is energized, terminal 1 is connected to positive potential over contacts 1Z110N, 1Z111C, and 1Z112C.

A second translator 11 is similarly realized as a group of relays Z210, Z211, and Z212 arranged to be energized by corresponding wipers 204, 205, and 206 associated with the same program strip 107, whereby to cause the energization at negative supply potential of single output terminals of a further group of terminals labelled A, B, C, D, E, F, G, and H from the rows of perforations passing under these wipers. These latter terminals are arranged to be energized at a potential differing from that of group 1 to 8 referred to, viz., negative, whereby to enable further relay elements connected in orthogonal grid matrix relation with the respective translator outputs to be energized jointly and operated thereby.

*The Matrix*

In the foregoing description, it has been shown that a single perforated record strip 107 bearing a code of six positions associated with six wipers and a source of electrical supply 80 may be used to produce pairs of outputs consisting of one of the terminals 1 to 8 energized at one potential, for example positive, and one of the terminals A to H energized at a different potential, for example negative. Accordingly, for all possible arrangements of the six hole code passing under the wipers, it is possible to select any one of the pairs produced by associating one of the group of terminals lettered A to H with one of the group of terminals numbered 1 to 8. Clearly this permits any one of sixty-four combinations to be selected.

It will be helpful to describe here the nomenclature for relay windings, relay poles, and relay contacts used throughout this specification. The designation for a relay includes the prefix Z, followed by two or more ciphers, as for example Z110. Where the relay has a latch release winding, this winding is denoted by the combination ZL, for example ZLB7. Where the relay has one or more poles, a prefix number denotes the first, second or third pole, for example 1Z110, 2Z110, etc. The normally open contact associated with a particular pole is denoted by the suffix N and the normally closed contact by the suffix C, the suffix not changing with the operational state of the device.

Referring to FIG. 3, a matrix is illustrated wherein certain ones are shown of a group of vertical busses labelled X1, X2, X3, ... X8, and a group of horizontal busses labelled YA, YB, YC, ... YH. A corresponding set of relays connected as indicated in part at the intersections of bus pairs, for example the relays ZA1, ZB1, ... ZH1, all having one winding terminal connected with the common vertical bus X1, and their other winding terminal connected to respective horizontal busses. Similarly, a relay designated ZD4 would indicate its connection between busses YD and X4. The terminology here adopted places the prefix "Z" denoting a relay winding, ahead of the designation of the horizontal bus and the designation of the vertical bus, omitting the X and Y ciphers.

A set of poles carried by the armature of relay ZA1 are associated with the normally open contacts 1ZA1N–4ZA1N, and the armature is latchable to hold the contacts closed when the relay is operated. When positive potential is applied to vertical bus X1 and negative potential to horizontal bus YA, current flows through the unidirectional buffer device 30. Similarly, other buffer devices 31, 32 and 33 are interposed between vertical busses X2, X3, X4, and horizontal bus YA. The isolation of each relay matrix is necessary in order to avoid the possibility of operating other relays through translator faults. The energization of the winding is effective to connect a source L11 over contact 2ZA1N, to a terminal J1, which may be associated with pilot valve P1, a signal lamp, or other load which it is desired to operate. In a similar manner, the source L1 is connected over contact 1ZA1N with a terminal K, for example a supervisory lamp, or other signal device, or a guard circuit. The operation of the relay is effective further to apply a positive potential from the source 200 over each of the contacts 3ZA1N and 4ZA1N, thereby operating the latch release relays ZLA2 and ZLA4. With these latch release windings energized, the relays ZA2 and ZA4 cannot remain locked up.

When a further reading is translated from the program strip 107, the matrix will be conditioned to energize another system of relays. Assuming that in this instance relay ZA4 is operated by current flowing through buffer device 33 from bus X4 to bus YA, positive potential will be applied to each of contacts 3ZA4N and 4ZA4N, to operate release windings ZLA1 and ZLA2. Terminals K3 and J3 will now be energized from sources L11 and L1 respectively, J3 being associated with, for example, pilot valve P3.

When relay ZA3 is operated, the three latch release windings ZLA1, ZLA2 and ZLA4 will simultaneously be energized, to de-energize all of the matrix outputs associated with relays ZA1 to ZA4.

The foregoing circuits have been described to show an interlock system wherein only one of three devices such as P1, P2, or P3 may be energized while the other two are held inoperable, to completely control the direction of flow from a single source such as well No. 1. It is to be understood that more than three devices may be inter-related, by similarly interconnecting latch release windings of a correspondingly increased group of matrix relays. For example, interlocks may be so provided to ensure that only one of the pilot valves P2, P5, ... P23 will be energized at a time, to allow but one well to be on test, if desired, by providing additional switch poles for connecting release relay windings with supply 200.

While only part of a complete matrix arrangement is shown, it will be understood that many additional sets of interrelated switching circuits may be controlled by the output from translator 29. The duration of a period for which a particular condition is held is determined by the program stored on tape 107. A time-controlled means is provided for starting the feeding of the record strip 107, and means responsive to the translation of a reading stored in the record for stopping the drive until the next time-determined start signal is given. A clock device 20, which may be realized as any conventional clockwork mechanism, drives a wheel 21, on which a grounding contact 22 is carried. At a time determined by the rotational period of wheel 21, the wiper 23 is grounded, to energize the winding of relay Z300 from supply 24. This relay has a latching armature, so that the contact 1Z300N remains grounded, operating drive motor 26 from source 25 and thereby advancing the record strip 107 at a steady rate. The record will continue to move, until by the energization of a wiper or group of wipers from source 25, connected over cable 70 with translator 29, an appropriate output pair therefrom is energized from source 80. When the potential difference is applied across the winding of latch release winding ZL300, the armature is released and drive is stopped. The next advance of the program strip will not occur until the contact 22 has completed its travel in the clockwise direction to again make contact with wiper 23. This interval will be determined by the design of the clockwork and drive mechanisms, and in general will be of the order of five minutes although shorter or longer periods may also be employed to suit a given application.

The arrangement for automatic programming of production flow and the automatic timing and valve operation for testing free flow from wells, may reliably and safely be carried out with considerable economies of operation and maintenance, by the system described.

While the diagram illustrates a relatively compact arrangement of wells and valves, it must be appreciated that the actual layout of wells in a field may span many miles, and whereas a single test separator has been illustrated, it is also feasible to employ a number of test separators each associated with a number of wells to reduce line length therebetween.

We claim:

1. In apparatus for directing the flow of fluids in a distribution system by controlling periodically the opening and closing of valves in accordance with a recorded program, said apparatus comprising a record means, translating means for advancing and reading said record having a first and a second group of output leads and effective to selectably energize a single output lead in each group at different potentials in accordance with a reading, a matrix comprising an orthogonal bus grid having a first set of buses respectively connected with output leads of the first group and a second set of buses respectively connected with output leads of the second group, and a plurality of load devices connected at matrix junctions for energization from buses of said first and said second sets of buses for controlling valve states, the improvement which comprises means for advancing the record at predetermined times and for stopping the advance of said record throughout the remainder of an interval between said times upon reading of a stop code contained in said program, comprising a time-controlled source of short voltage pulses independent of said record recurring at the commencement of each interval, a record drive motor for advancing the record with respect to said translator means having a primary control operable in response to a pulse to start advance of said record, and an auxiliary control operable in response to energization of a predetermined load device in accordance with a reading of said stop code to stop said motor.

2. Apparatus as in claim 1 wherein said primary control comprises a relay having a latchable armature operable to close a supply circuit to said drive motor upon application of a pulse to operate said relay, and said auxiliary control comprises latch release mechanism operable by said predetermined load device.

3. A switching circuit for controlling a plurality of apparatus functions and for exclusively selecting a single function among a group of possible functions for an apparatus, comprising a matrix having a set of vertical buses and a set of horizontal buses, a pair of sources of differing electrical potentials, a program record, means under control of said record for selectably energizing a vertical bus with supply of one potential and a horizontal bus with supply of differing potential, a plurality of electromagnetically operated switching devices each having a pair of terminals respectively connected with one terminal to a common horizontal bus and with the other terminals to respective vertical buses, each of said switching devices controlling one of said group of apparatus functions and having latch elements latchable to hold the device in operated state upon energization from said selected buses, first circuit means controlled by each said device for effecting the release of a predetermined number of latch elements of other devices, a clearing device having a pair of terminals respectively connected with one terminal to said horizontal bus and with the other terminal to a vertical bus and second circuit means operable upon energization of said clearing device to render said switching devices non-latchable.

4. Translating apparatus for converting code record information from a program record containing load-selection and operation instructions and instructions to stop translation recorded thereon in one code, comprising a plurality of code conversion devices, a plurality of outputs comprising a first group selectably connectible with a first supply of a reference polarity and a second group selectably connectible with a second supply of a different polarity, drive means operable to advance said record with respect to a set of sensing elements, circuit means associated with said elements responsive to recorded information effective to operate said code conversion devices to selectably energize a pair of outputs including one output from each of said groups, a drive supply, independent time-controlled circuit closing means for periodically energizing said drive means from said drive supply, and drive stop means having respective terminals connected with a predetermined pair of outputs energizeable in response to translation of a stop instruction to effect opening of said drive supply circuit.

5. Translating apparatus as in claim 4 wherein said drive supply circuit closing means includes a relay winding having an armature latchable in operated state when said winding is energized to connect said drive supply to said drive means, and said drive stop means comprises a further winding operable to release said latch.

6. The combination with: a process sequence control record, a pair of sources of differing reference potentials, a translating means having two groups of outputs and a motor drive means for effecting relative movement of said record with respect to said translating means for selectably energizing from respective sources a pair of outputs selected one from each of said two groups of outputs in accordance with respective information codes stored in said record, a matrix comprising Cartesian co-ordinate grid elements having said groups of outputs respectively connected with ordinate and abscissa buses, an independent time-controlled generator of periodically recurrent electrical pulses and pulse-responsive relay means effective to close a first circuit to energize said motor drive means, of record movement control means including an electromagnetic switch means connected with a predetermined pair of outputs and energizeable from said sources upon translation of drive stop instruction encoded in said record, and second circuit means operable by said electromagnetic switch to open said first circuit and to stop said drive.

References Cited in the file of this patent
UNITED STATES PATENTS

| | | |
|---|---|---|
| 2,055,031 | Hutchins | Sept. 22, 1936 |
| 2,154,994 | Prescott | Apr. 18, 1939 |
| 2,552,788 | Hoover | May 15, 1951 |
| 2,628,277 | Spencer | Feb. 10, 1953 |
| 2,769,968 | Schultheis | Nov. 6, 1956 |
| 2,844,811 | Burkhart | July 22, 1958 |
| 2,965,720 | Bumstead | Dec. 20, 1960 |